United States Patent
Komatsuzaki et al.

(10) Patent No.: US 8,897,932 B2
(45) Date of Patent: Nov. 25, 2014

(54) FLIGHT CONTROL SUPPORT DEVICE

(75) Inventors: Kosuke Komatsuzaki, Susono (JP); Masatsugu Ishiba, Gotenba (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 82 days.

(21) Appl. No.: 13/695,829

(22) PCT Filed: Jun. 7, 2010

(86) PCT No.: PCT/JP2010/059630
§ 371 (c)(1),
(2), (4) Date: Nov. 2, 2012

(87) PCT Pub. No.: WO2011/155020
PCT Pub. Date: Dec. 15, 2011

(65) Prior Publication Data
US 2013/0060405 A1    Mar. 7, 2013

(51) Int. Cl.
| | |
|---|---|
| *G08G 5/00* | (2006.01) |
| *G08G 5/04* | (2006.01) |
| *G05D 1/06* | (2006.01) |
| *B64C 13/18* | (2006.01) |
| *B64C 13/22* | (2006.01) |
| *B64D 45/04* | (2006.01) |

(52) U.S. Cl.
CPC ............ *G05D 1/0646* (2013.01); *G08G 5/0086* (2013.01); *G08G 5/006* (2013.01)
USPC ................. 701/3; 701/14; 701/411; 701/448; 244/3.21; 244/17.13; 244/75.1; 244/76 R; 244/175; 244/185; 244/186; 244/221

(58) Field of Classification Search
CPC .. B64C 13/18; B64C 13/22; B64C 2201/141; B64C 15/02; B64D 45/04; B64D 2045/0045; B64D 2045/0055; G08G 5/00; G08G 5/04; G08G 5/045

USPC ............ 701/3, 14, 411, 448; 244/3.21, 17.13, 244/75.1, 76 R, 175, 185–186, 221
See application file for complete search history.

(56) References Cited

U.S. PATENT DOCUMENTS

| | | | |
|---|---|---|---|
| 6,199,008 B1 * | 3/2001 | Aratow et al. ................. | 701/120 |
| 7,158,877 B2 * | 1/2007 | Carlsson et al. .................. | 701/2 |

(Continued)

FOREIGN PATENT DOCUMENTS

| | | |
|---|---|---|
| JP | 6 72390 | 3/1994 |
| JP | 7-69299 A | 3/1995 |

(Continued)

OTHER PUBLICATIONS

International Search Report Issued Jul. 13, 2010 in PCT/JP10/59630 Filed Jun. 7, 2010.

*Primary Examiner* — Mary Cheung
*Assistant Examiner* — Atul Trivedi
(74) *Attorney, Agent, or Firm* — Oblon, Spivak, McClelland, Maier & Neustadt, L.L.P.

(57) ABSTRACT

Disclosed is a flight control support device which sets a flight restricted area W along a terrain, thereby achieving improvement in safety of a small aircraft A and sufficiently securing the degree of freedom of flight course selection of a pilot. The flight control support device includes a terrain information acquirer, an aircraft information acquirer, a flight restricted area setter which sets the flight restricted area W along the terrain on the basis of the terrain information acquired by the terrain information acquirer and the aircraft information acquired by the aircraft information acquirer, and a flight control supporter which supports flight control of a flying object on the basis of the flight restricted area set by the flight restricted area setter.

6 Claims, 10 Drawing Sheets

(56) References Cited

U.S. PATENT DOCUMENTS

| | | |
|---|---|---|
| 7,693,624 B2 * | 4/2010 | Duggan et al. ............... 701/24 |
| 7,899,620 B2 | 3/2011 | Jourdan et al. |
| 7,925,394 B2 * | 4/2011 | Deker et al. ............... 701/18 |
| 8,135,501 B2 * | 3/2012 | Boorman et al. ............. 701/3 |
| 2002/0161514 A1 | 10/2002 | Shinagawa |
| 2003/0060940 A1 * | 3/2003 | Humbard et al. ............. 701/3 |
| 2005/0273220 A1 * | 12/2005 | Humbard et al. ............. 701/3 |
| 2006/0106506 A1 * | 5/2006 | Nichols et al. ............... 701/3 |
| 2007/0088466 A1 * | 4/2007 | Preston ....................... 701/3 |
| 2007/0138345 A1 * | 6/2007 | Shuster ...................... 244/186 |
| 2009/0105890 A1 * | 4/2009 | Jones et al. .................. 701/1 |
| 2010/0152932 A1 * | 6/2010 | Das ............................. 701/14 |
| 2010/0292871 A1 * | 11/2010 | Schultz et al. ............... 701/3 |
| 2012/0123669 A1 * | 5/2012 | Shuster ...................... 701/120 |

FOREIGN PATENT DOCUMENTS

| | | |
|---|---|---|
| JP | 2000-352584 A | 12/2000 |
| JP | 2002-211494 A | 7/2002 |
| JP | 2002-274495 A | 9/2002 |
| JP | 2004 233082 | 8/2004 |
| JP | 2008 536736 | 9/2008 |

* cited by examiner

FLIGHT CONTROL SUPPORT DEVICE

TECHNICAL FIELD

The present invention relates to a flight control support device which supports flight control of a flying object.

BACKGROUND ART

Various techniques for flight control support of a flying object have been heretofore developed. For example, PCT Japanese Translation Patent Publication No. 2008-536736 discloses a system which performs automatic flight control of an aircraft such that, when there is a topographical relief in front of the aircraft which makes a flight along a predetermined flight course, the aircraft goes beyond the topographical relief.

CITATION LIST

Patent Literature

Patent Literature 1: PCT Japanese Translation Patent Publication No. 2008-536736

SUMMARY OF INVENTION

Technical Problem

However, in the system of the related art, it is assumed that the aircraft makes a flight along a predetermined flight course. For this reason, during a sightseeing flight in which the flight course is changed in accordance with the intention of the pilot, there is a problem in that the degree of freedom of flight course selection of the pilot is excessively restricted due to the automatic flight control of the system.

Accordingly, an object of the invention is to provide a flight control support device which sets a flight restricted area along a terrain, thereby achieving improvement in safety of the flying object and sufficiently securing the degree of freedom of flight course selection of the pilot.

Solution to Problem

In order to solve the above-described problem, the invention provides a flight control support device which supports flight control of a flying object. The flight control support device includes a terrain information acquisition unit which acquires terrain information, an aircraft information acquisition unit which acquires aircraft information of the flying object, a flight restricted area setting unit which sets a flight restricted area along a terrain on the basis of the terrain information acquired by the terrain information acquisition unit and the aircraft information acquired by the aircraft information acquisition unit, and a flight control support unit which supports flight control of the flying object on the basis of the flight restricted area set by the flight restricted area setting unit.

According to the flight control support device of the invention, since flight control of the flying object is supported on the basis of the flight restricted area set along the terrain, it is possible to appropriately suppress an unintended approach of the flying object to the ground, thereby achieving improvement in safety of the flying object. According to the flight control support device of the invention, the flight restricted area is set on the basis of the aircraft information of the flying object, making it possible to set the flight restricted area which can be evaded with reasonable flight control based on the maneuverability of the flying object. According to the flight control support device of the invention, since the flight restricted area is set along the terrain, it is possible to avoid an unnecessary limitation on a flight course, thereby sufficiently securing the degree of freedom of flight course selection of the pilot of the flying object. Therefore, according to the flight control support device of the invention, it is possible to achieve improvement in safety of the flying object and to sufficiently secure the degree of freedom of flight course selection.

It is preferable that the terrain information includes emergency landing site information relating to a emergency landing site, the aircraft information includes glide ratio information of the flying object, the flight control support device according to the invention further includes a gliding surface calculation unit which calculates a gliding surface for the emergency landing site on the basis of the emergency landing site information and the glide ratio information, and the flight restricted area setting unit sets the flight restricted area on the basis of the gliding surface calculated by the gliding surface calculation unit.

According to the flight control support device of the invention, the gliding surface as the reference of the altitude at which the flying object can reach the emergency landing site by gliding can be calculated on the basis of the emergency landing site information and the glide ratio information. For this reason, in the flight control support device of the invention, the flight restricted area is set on the basis of the gliding surface, making it possible to perform flight control support such that the flying object can reach the emergency landing site by gliding even when the power fails during flight. Therefore, according to the flight control support device of the invention, it is possible to achieve improvement in safety of the flying object.

It is preferable that the flight control support device according to the invention further includes a propulsion device failure determination unit which determines failure of a propulsion device of the flying object, a positional information acquisition unit which acquires positional information of the flying object, and a glidable range calculation unit which calculates a glidable range of the flying object on the basis of the positional information and the glide ratio information of the flying object when the propulsion device failure determination unit determines that the propulsion device fails, and when the glidable range calculation unit calculates the glidable range, the flight restricted area setting unit sets the flight restricted area on the basis of the glidable range, the positional information of the flying object, and the emergency landing site information so as to lead the flying object to the emergency landing site within the glidable range.

According to the flight control support device of the invention, the glidable range which can be reached by the flying object with only gliding when the propulsion device of the flying object fails is calculated, and the flight restricted area is set such that the flying object is led to the emergency landing site within the glidable range, thereby increasing the success probability of emergency landing of the flying object. Therefore, according to the flight control support device of the invention, it is possible to achieve improvement in safety of the flying object.

In the flight control support device according to the invention, it is preferable that the aircraft information includes maximum climbing rate information of the flying object, and the flight restricted area setting unit sets the flight restricted area on the basis of the maximum climbing rate information.

According to the flight control support device of the invention, the flight restricted area is set on the basis of the maximum climbing rate information of the flying object, making it possible to set the flight restricted area W such that evasion can be done with reasonable flight control according to the climbing performance of the flying object. This contributes to improvement in stability and riding comfort of the flying object.

It is preferable that the terrain information includes airport position information relating to the position of an airport, the aircraft information includes residual flight range information of the flying object, the flight control support device according to the invention further includes a positional information acquisition unit which acquires positional information of the flying object, and a flight limiting surface calculation unit which calculates a flight limiting surface for the airport on the basis of the positional information of the flying object acquired by the positional information acquisition unit, the airport position information, and the residual flight range information, and the flight restricted area setting unit sets the flight restricted area on the basis of the flight limiting surface calculated by the flight limiting surface calculation unit.

According to the flight control support device of the invention, the flight limiting surface as the reference of the airspace where the flying object can land at the airport within the residual flight range can be calculated on the basis of the positional information of the flying object, the airport position information, and the residual flight range. For this reason, in the flight control support device of the invention, the flight restricted area is set on the basis of the flight limiting surface, thereby avoiding the flying object from entering the airspace where the flying object does not return to the airport.

In the flight control support device according to the invention, it is preferable that, when the flying object enters the flight restricted area, the flight control support unit performs flight control for returning the flying object outside the flight restricted area.

According to the flight control support device of the invention, since flight control for returning the flying object outside the flight restricted area is performed, even when the pilot is unaware of entering the flight restricted area, it is possible to secure safety of the flying object.

Advantageous Effects of Invention

According to the invention, it is possible to achieve improvement in safety of the flying object and to sufficiently secure the degree of freedom of flight course selection of the pilot.

DESCRIPTION OF EMBODIMENTS

Hereinafter, a preferred embodiment of the invention will be described in detail with reference to the drawings.

Figure 1:
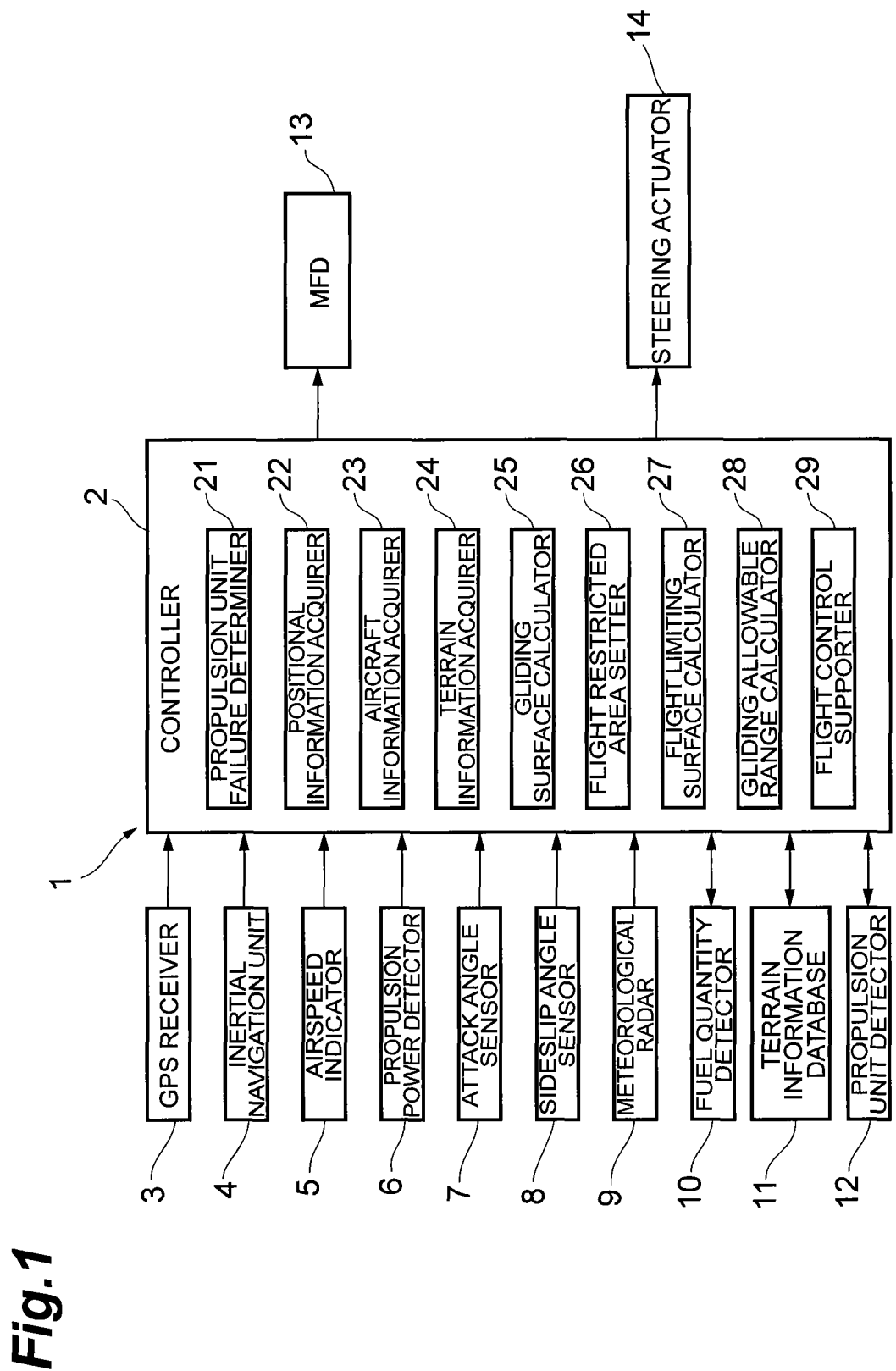
FIG. 1 is a block diagram showing an embodiment of a flight control support device according to the invention.
Figure 2:
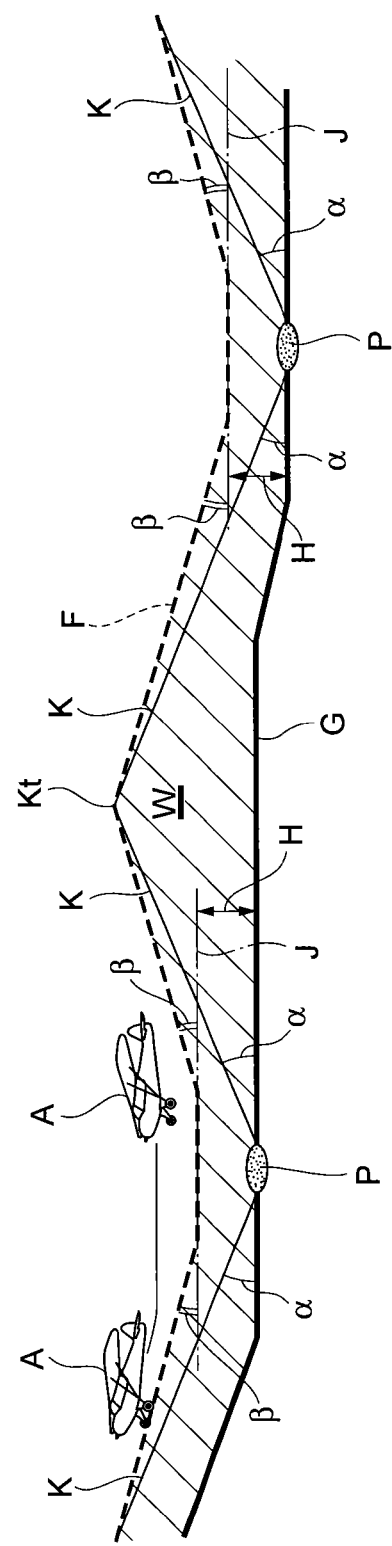
FIG. 2 is a diagram showing a flight restricted area which is set along a terrain.

As shown in FIGS. 1 and 2, a flight control support device 1 of this embodiment is provided in a small aircraft A, and supports flight control of a pilot of the small aircraft A. The small aircraft A is an aircraft which is used for a sightseeing flight. During the sightseeing flight, the flight course is freely changed by the pilot.

The flight control support device 1 sets a flight restricted surface F which is the boundary of an area where flight should be restricted from the viewpoint of safety and an area where flight is not restricted. The flight control support device 1 sets the flight restricted surface F such that the area where flight is not restricted increases so as to secure the degree of freedom of flight course selection of the pilot. The flight control support device 1 sets the area where the flight of the small aircraft A should be restricted as a flight restricted area W on the basis of the set flight restricted surface F. The flight control support device 1 performs various kinds of flight control support such that the small aircraft A does not enter the flight restricted area W.

Figure 3:
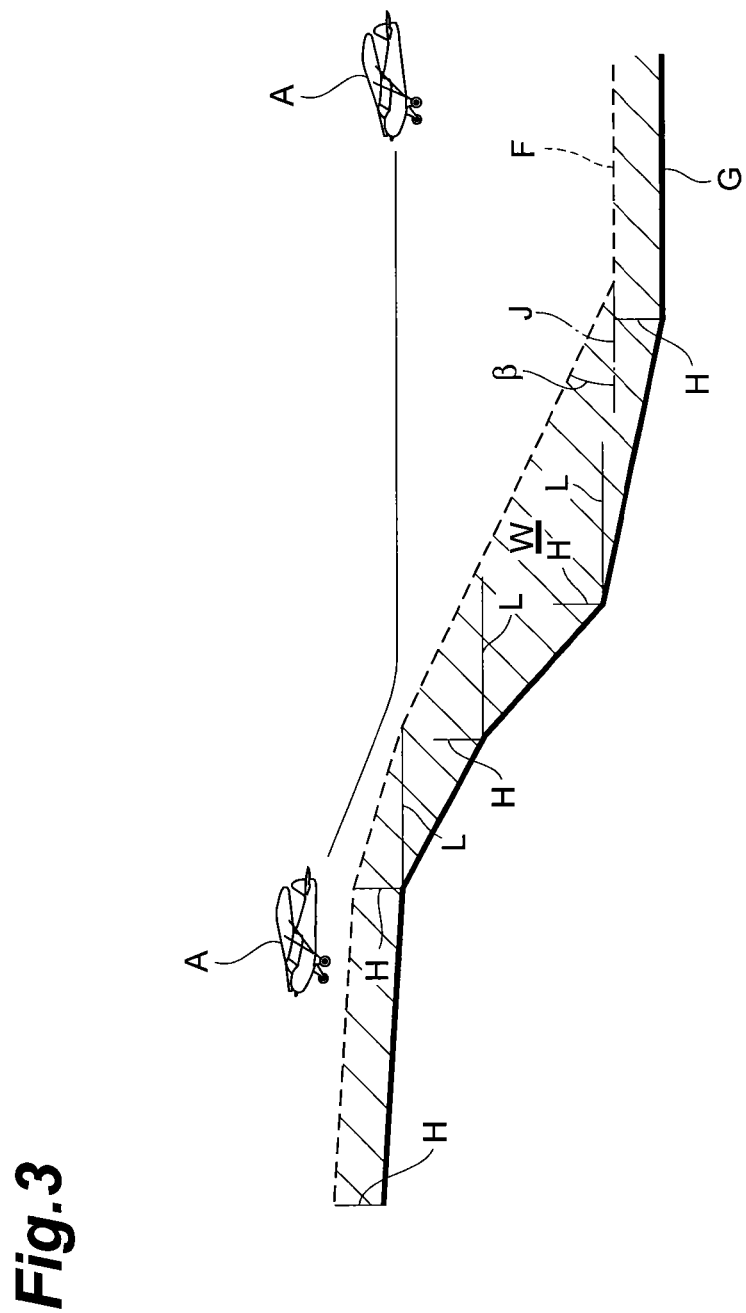
FIG. 3 is a diagram showing a flight restricted area which is set in accordance with a maximum climbing rate of a small aircraft.

FIGS. 2 and 3 are diagrams showing a flight restricted area W which is set along a terrain. As shown in FIGS. 2 and 3, the flight control support device 1 sets a flight restricted surface F along a terrain so as to prevent the small aircraft A from colliding against the ground. The flight control support device 1 sets the airspace between the flight restricted surface F set along the terrain and the ground as a flight restricted area W.

The flight control support device 1 sets the flight restricted surface F at an altitude higher than a legal minimum altitude H. The small aircraft A should fly at an altitude higher than the legal minimum altitude H except for emergency. For this reason, the flight control support device 1 sets a legal minimum altitude surface J along the height of the legal minimum altitude H from the ground. The flight control support device 1 sets the flight restricted surface F at an altitude equal to or higher than the legal minimum altitude surface J so as to restrict the flight of the small aircraft A at an altitude equal to or lower than the legal minimum altitude H.

The flight control support device 1 sets the flight restricted surface F such that the small aircraft A can reach a emergency landing site P by gliding even when the power of the small aircraft A fails. The emergency landing site P refers to the site which has the width such that the small aircraft A can make emergency landing in emergency. As the emergency landing site P, a playground, a square of a park, a rural area, or the like is selected.

FIG. 2 shows a gliding angle $\alpha$ of the small aircraft A. The gliding angle $\alpha$ is a course angle when an attack angle is taken such that the gliding performance of the small aircraft A is maximal. The gliding angle $\alpha$ is definitively defined along with the glide ratio from the aerodynamic characteristic of the small aircraft A. FIG. 2 shows a gliding surface K for the emergency landing site P. The gliding surface K is represented by the surface which extends obliquely upward from the emergency landing site P at the gliding angle α. The gliding surface K represents the altitude at which the small aircraft A can reach the emergency landing site P by gliding. That is, the gliding surface K is set such that the small aircraft A which is flying above the gliding surface K can reach the emergency landing site P by gliding even when the power of the small aircraft A fails. The gliding surface K is formed along the side of a reverse triangular pyramid with the emergency landing site P as the vertex. The gliding surface K is set for each emergency landing site P. The gliding surfaces K of adjacent emergency landing sites P intersect each other to form a linear intersection portion Kt. The intersection portion Kt becomes the end of each gliding surface K. That is, the intersecting gliding surfaces K form a continuous surface through the intersection portion Kt. The flight control support device 1 sets the flight restricted surface F at an altitude higher than the gliding surface K such that the small aircraft A can reach any emergency landing site P by gliding even when the power of the small aircraft A fails.

The flight control support device 1 sets the flight restricted surface F such that the climbing angle of the flight restricted surface F does not exceed a maximum climbing angle β of the small aircraft A. The maximum climbing angle β is the course angle αt a maximum climbing rate when the climbing performance of the small aircraft A is maximal. The maximum climbing angle β changes depending on the altitude of the small aircraft A. In FIG. 2, for ease of understanding, the maximum climbing angle β is constant.

If the climbing angle of the flight restricted surface F exceeds the maximum climbing angle β of the small aircraft A, there is an increasing possibility that the small aircraft A which flies along the flight restricted surface F does not sufficiently climb and enters the flight restricted surface F. For this reason, the flight control support device 1 sets the flight restricted surface F such that the climbing angle of the flight restricted surface F does not exceed the maximum climbing angle β. Specifically, in the case shown in FIG. 2, since the maximum climbing angle β is smaller than the gliding angle α of the small aircraft A, the flight restricted surface F is set on the gliding surface K such that the climbing angle of the flight restricted surface F becomes the maximum climbing angle β. That is, the flight restricted surface F with the maximum climbing angle β is set on the portion of the gliding surface K connecting the legal minimum altitude surface J and the intersection portion Kt.

As shown in FIG. 3, in order to prevent the small aircraft A from colliding against an obstacle, such as a mountain or a building, the flight control support device 1 sets the flight restricted surface F offset in the horizontal direction from the obstacle. FIG. 3 shows an offset distance L in the horizontal direction. The flight control support device 1 sets the offset distance L in the horizontal direction shown in FIG. 3 on the basis of the turning radius of the small aircraft A.

Figure 4:
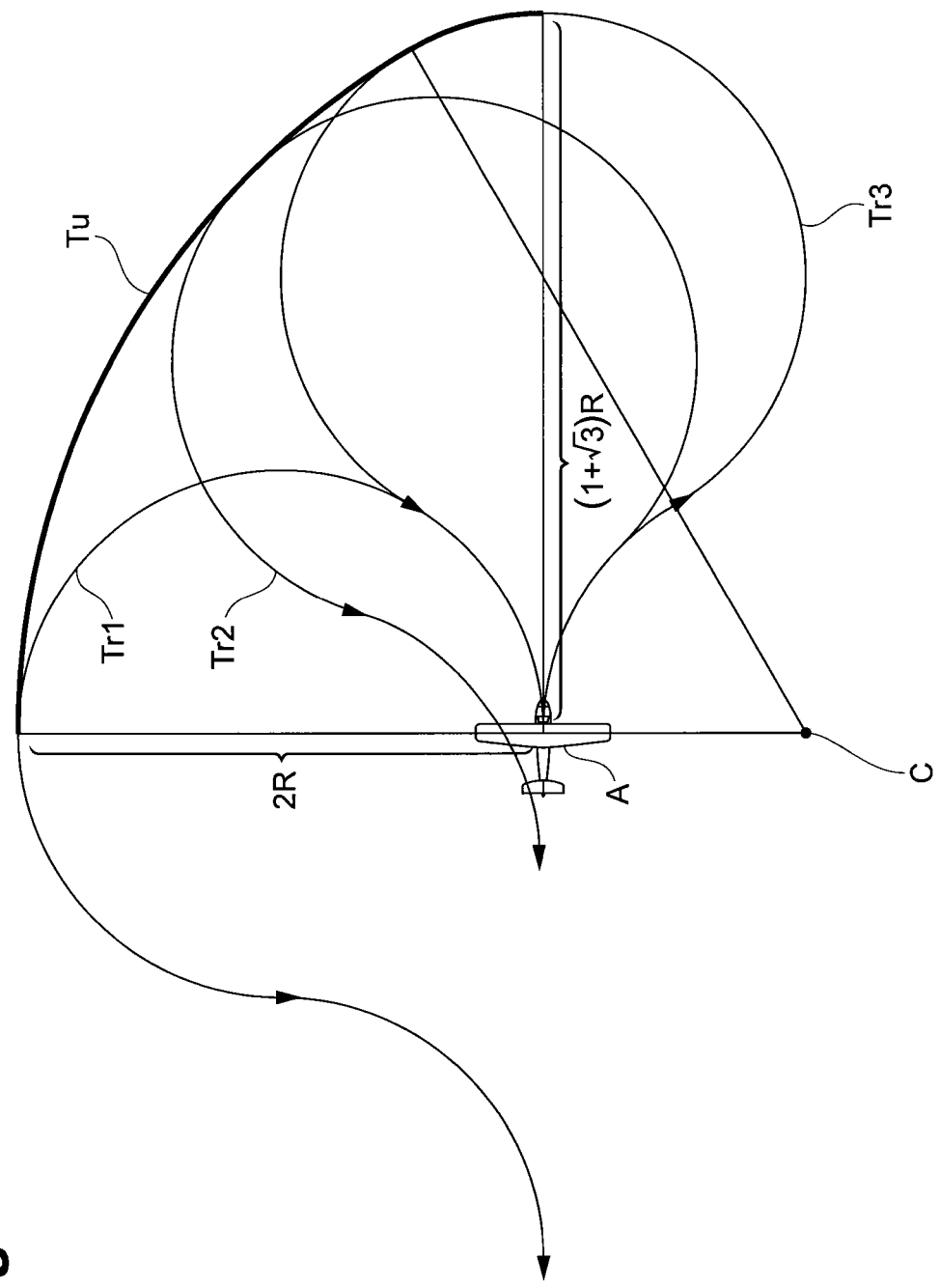
FIG. 4 is a diagram showing a possible trajectory of a small aircraft in turning evasion under a calm condition.

FIG. 4 shows a possible trajectory of the small aircraft A in turning evasion under a calm condition. Tr1 to Tr3 shown in FIG. 4 are the trajectories when the small aircraft A continues to make turning evasion to either left or right within the horizontal plane. Tr1 is the trajectory when the small aircraft A makes turning evasion with only counterclockwise rotation. Tr2 shown in FIG. 4 is the trajectory when the small aircraft A is switched to turning in a counterclockwise direction immediately after turning evasion starts in a clockwise direction. Tr3 shown in FIG. 4 is the trajectory when the small aircraft A is switched to turning in a counterclockwise direction at the timing later than Tr2 after turning evasion starts in a clockwise direction. Tr3 denotes the trajectory which most projects forward when the small aircraft A continues to make turning evasion from the clockwise direction to the counterclockwise direction.

R shown in FIG. 4 is the turning radius of the small aircraft A. The turning radius R changes depending on the speed of the small aircraft A. As shown in FIG. 4, in order to complete the turning evasion of Tr1, a space two times larger than the turning radius R is required on the left side of the small aircraft A. In order to complete the turning evasion of Tr3, a space $(1+\sqrt{3})$ times larger than the turning radius R is required in front of the small aircraft A. FIG. 4 shows a space Tu necessary for completing turning evasion when the small aircraft A continues to make turning evasion only in the counterclockwise direction or from the clockwise direction to the counterclockwise direction. Tu is represented as an arc centering on a point C. The position of the point C can be calculated from, for example, the speed, the turning radius, or the like of the small aircraft A.

Figure 5:
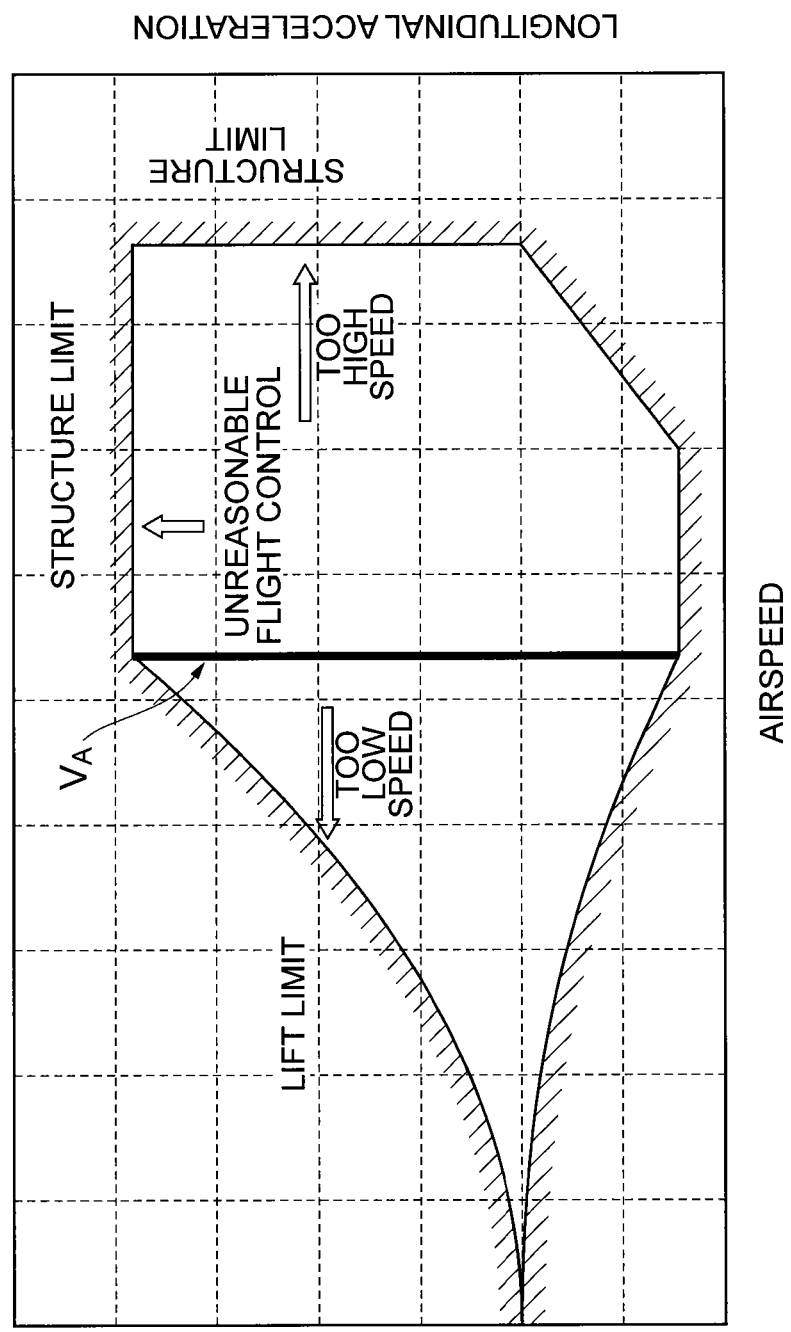
FIG. 5 is a flight envelope diagram showing the relationship between speed and longitudinal acceleration of a small aircraft.

FIG. 5 is a flight envelope diagram showing the relationship between speed and longitudinal acceleration of the small aircraft A. The speed shown in FIG. 5 is airspeed. When the turning ability of the small aircraft A is maximal, this refers to when the highest longitudinal acceleration is obtained at the lowest speed within the flight envelope shown in FIG. 5. At this time, the small aircraft A can evade an obstacle with the smallest turning radius. The speed of the small aircraft A which can realize this turning evasion is represented as $V_A$. $V_A$ is a so-called maneuvering speed. As shown in FIG. 5, if the speed of the small aircraft A is too low compared to $V_A$, this leads to a lift limit, and consequently causes a stall. If the speed of the small aircraft A is too high compared to $V_A$, or if the longitudinal acceleration increases excessively, this leads to a structure limit of the aircraft, and consequently becomes overloaded with the aircraft.

The flight control support device 1 sets the offset distance L in the horizontal direction shown in FIG. 3 on the basis of the turning radius of the small aircraft A shown in FIGS. 4 and 5. The flight control support device 1 sets the offset distance L in the horizontal direction on the basis of error in the obstacle position in the terrain information, error in the positional information of the small aircraft A, error in the maneuver state information of the small aircraft A, wind effects, and the like, in addition to the turning radius of the small aircraft A.

As shown in FIGS. 2 and 3, the flight control support device 1 sets the flight restricted surface F away from an obstacle at equal to or greater than the offset distance L in the horizontal direction and equal to or greater than an offset distance H in the vertical direction so as to prevent the small aircraft A from colliding against an obstacle, such as a mountain or a building. The flight control support device 1 sets an airspace between the flight restricted surface F set along the terrain and the ground as the flight restricted area W.

The flight control support device 1 performs flight control support such that the small aircraft A is in a balanced state over the flight restricted surface F set along the terrain. The balanced state refers to the state where aerodynamic force, propulsion power, and the like applied to the small aircraft A are all balanced and flight control force is zero. At this time, the flight restricted surface F set along the terrain becomes the reference surface for making the balanced state.

When a meteorological obstruction, such as thundercloud, is detected, the flight control support device 1 sets the flight restricted surface F so as to evade the meteorological obstruction. In this case, the flight restricted surface F is set a vertical surface which blocks between the small aircraft A and the meteorological obstruction. The flight control support device 1 sets an airspace outside the flight restricted surface F when viewed from the small aircraft A as the flight restricted area W. The flight control support device 1 performs flight control support such that the small aircraft A does not enter the flight restricted area W so as to evade the meteorological obstruction.

When it is determined that the small aircraft A is near an airport, the flight control support device 1 sets the flight restricted surface F so as to lead the small aircraft A to a flight course set in advance for the airport. Specifically, the flight control support device 1 sets the flight restricted surface F such that only the portion of the flight restricted surface F corresponding to the approach direction to the runway of the airport is tilted toward the ground. The flight control support device 1 keeps the altitude for the flight restricted surface F other than the portion corresponding to the approach direction to the runway of the airport. The flight control support device 1 sets the gradient of the flight restricted surface F such that the small aircraft A approaches the runway at a predetermined course angle determined from the regulations of the airport or aircraft performance. The flight control support device 1 performs flight control support such that the small aircraft A can approach the runway while keeping the balanced state along the flight restricted surface F.

When it is determined that the small aircraft A is near a controlled airspace boundary, the flight control support device 1 sets the flight restricted surface F at the controlled airspace boundary. The flight control support device 1 sets a controlled airspace outside the flight restricted surface F when viewed from the small aircraft A as the flight restricted area W. When it is determined that the small aircraft A obtains passage through the controlled airspace boundary from flight control, the flight control support device 1 releases the flight restricted surface F at the controlled airspace boundary. When it is determined that the small aircraft A passes through the controlled airspace boundary, the flight control support device 1 sets the flight restricted surface F at the controlled airspace boundary again. The flight control support device 1 sets the flight restricted surface F at the controlled airspace boundary such that the small aircraft A does not enter a misguided controller airspace. The flight control support device 1 performs flight control support such that the small aircraft A does not enter the flight restricted area W set for the controlled airspace.

Figure 6:
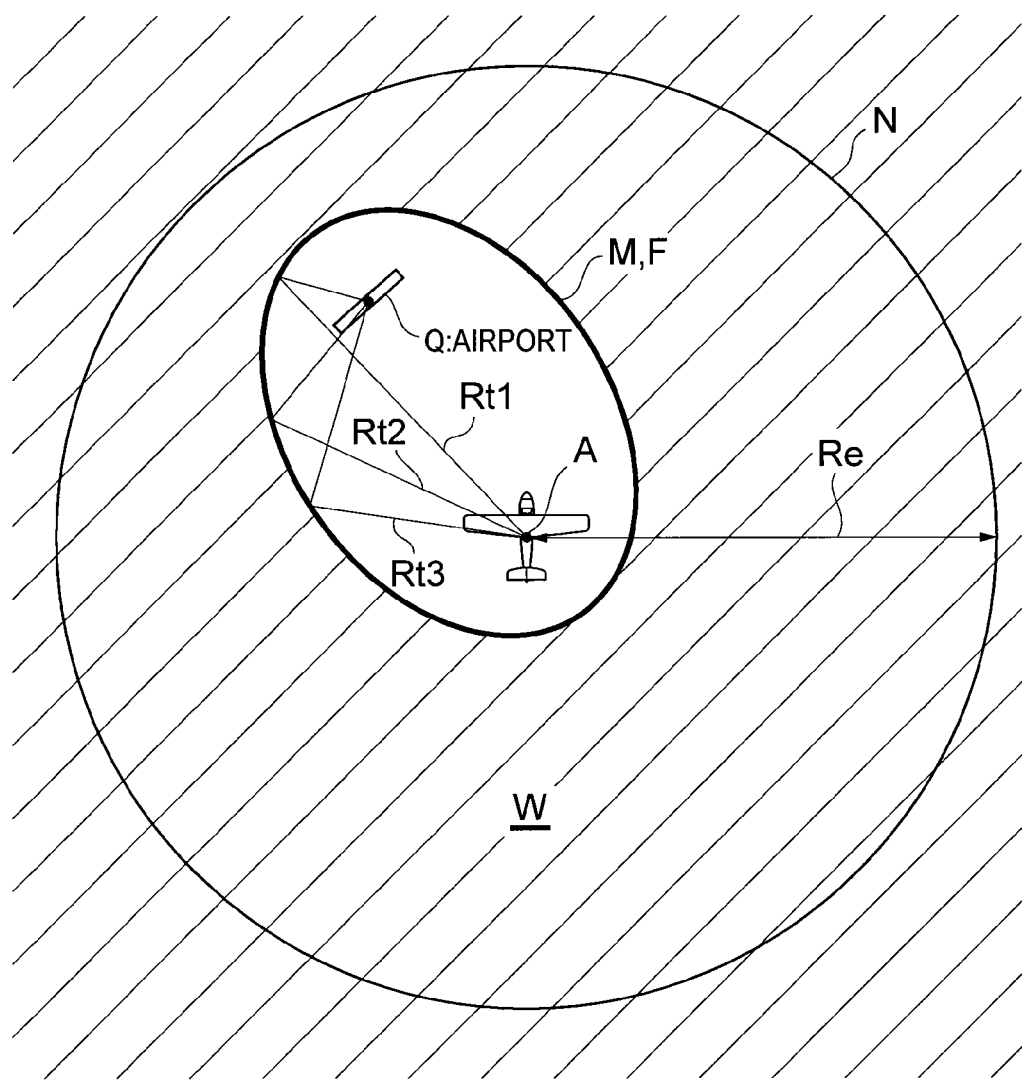
FIG. 6 is a diagram showing a flight restricted area which is set in accordance with a residual flight range of a small aircraft.

FIG. 6 is a diagram showing a flight restricted area W which is set in accordance with a residual flight range of the small aircraft A. As shown in FIG. 6, the flight control support device 1 sets a flight restricted surface F on the basis of the positional relationship between the small aircraft A and an airport Q, and the residual flight range of the small aircraft A so as to allow the small aircraft A to reach the airport within the residual flight range Re. The residual flight range Re is the range which can be reached by the small aircraft A with the quantity of remaining fuel. The residual flight range Re is calculated from the quantity of remaining fuel or aircraft performance.

FIG. 6 shows a reachable surface N of the small aircraft A. The reachable surface N is the surface representing a reachable limit when the small aircraft A makes a flight with full use of fuel without going toward the airport. In FIG. 6, for ease of understanding, it is assumed that the residual flight range Re is constant in every direction of the small aircraft A. That is, it is assumed that the turning of the small aircraft A does not affect the residual flight range Re. It is also assumed that a terrain around the small aircraft A is fat and under a clam condition. In this case, the reachable surface N is represented as a circle with the residual flight range Re as a radius on the plane.

FIG. 6 shows a flight limiting surface M of the small aircraft A for the airport Q. The flight limiting surface M is the surface which becomes the reference of an airspace where the small aircraft A can land at the airport Q within the residual flight range Re. The inside of the flight limiting surface M becomes the airspace where the small aircraft A can land at the airport Q within the residual flight range Re. The outside of the flight limiting surface M becomes an airspace where the small aircraft A cannot land at the airport Q within the residual flight range Re.

In FIG. 6, the flight limiting surface M is represented as a cluster of points where the sum of the distance from the small aircraft A and the distance from the airport Q is equal to the residual flight range Re. That is, the flight limiting surface M is represented as an ellipse focusing on the small aircraft A and the airport Q on the plane. Rt1 to Rt3 shown in FIG. 6 are the courses along which the small aircraft A reaches the airport Q with full use of remaining fuel. Rt1 to Rt3 are formed inside the flight limiting surface M. The length of Rt1 to Rt3 becomes equal to the residual flight range Re.

The flight control support device 1 calculates the flight limiting surface M on the basis of the positional relationship between the small aircraft A and the airport Q, and the residual flight range of the small aircraft A. The flight control support device 1 calculates the flight limiting surface M taking into consideration the effect of the turning of the small aircraft A on the residual flight range Re, the effect of wind or terrain. The flight control support device 1 sets the calculated flight limiting surface M as the flight restricted surface F. The flight control support device 1 may set the flight restricted surface F inward of the flight limiting surface M so as to allow a space. The flight control support device 1 sets an airspace outside the flight restricted surface F when viewed from the small aircraft A as the flight restricted area W. The flight control support device 1 performs flight control support such that the small aircraft A does not enter the flight restricted area W.

When it is determined that the propulsion device of the small aircraft A fails, the flight control support device 1 calculates a glidable range on the basis of the altitude, the glide ratio, and the quantity of maneuver state of the small aircraft A, and the ambient terrain. The glidable range is the range which can be reached by the small aircraft A by gliding from the current position. Even when the propulsion device fails, the small aircraft A can reach a site within the glidable range by gliding. The flight control support device 1 sets the flight restricted surface F so as to lead the small aircraft A to a emergency landing site P within the glidable range. The flight control support device 1 constantly sets the flight restricted surface F at a position below the small aircraft A because of emergency.

For example, the flight control support device 1 sets the flight restricted surface F such that only a portion of the flight restricted surface F corresponding to the direction toward the emergency landing site P is tilted toward the ground. In this case, the flight control support device 1 keeps the altitude for the flight restricted surface F other than the portion corresponding to the direction toward the emergency landing site P. The flight control support device 1 sets the gradient of the flight restricted surface F such that the small aircraft A makes emergency landing at the emergency landing site P at a predetermined course angle determined from the aircraft performance of the small aircraft A or the like. The flight control support device 1 performs flight control support such that, if possible, the small aircraft A can reach the emergency landing site P while keeping the balanced state along the flight restricted surface F. The flight control support device 1 sets an airspace outside the flight restricted surface F when viewed from the small aircraft A as the flight restricted area W. The flight control support device 1 performs flight control support such that the small aircraft A does not enter the flight restricted area W.

Hereinafter, the configuration of the flight control support device 1 of this embodiment will be described.

As shown in FIG. 1, the flight control support device 1 of this embodiment includes a controller 2 which performs overall control of the small aircraft A. The controller 2 is an electronic control unit which has a CPU [Central Processing Unit], a ROM [Read Only Memory], a RAM [Random Access Memory], and the like.

The controller 2 is electrically connected to a GPS [Global Positioning System] receiver 3, an inertial navigation unit 4, an airspeed indicator 5, a propulsion power detector 6, an attack angle sensor 7, and a sideslip angle sensor 8. The controller 2 is electrically connected to a meteorological radar 9, a fuel quantity detector 10, a terrain information database 11, a propulsion device detector 12, an MFD [Multi Function Display] 13, and a steering actuator 14.

The GPS receiver 3 receives signals from a plurality of GPS satellites and detects the current position of the small aircraft A. The GPS receiver 3 transmits information relating to the detected current position of the small aircraft A to the controller 2.

The inertial navigation unit 4 detects the speed, acceleration, traveling direction, and the like of the small aircraft A. inertial navigation unit 4 has a gyroscope, an accelerometer, an arithmetic device, and the like. The inertial navigation unit 4 transmits flight information including the detected speed and the like to the controller 2.

The airspeed indicator 5 detects an airspeed which is the relative speed of the small aircraft A and ambient air. The airspeed indicator 5 transmits airspeed information relating to the detected airspeed to the controller 2. The propulsion power detector 6 is connected to the propulsion device of the small aircraft A, and detects propulsion power of the small aircraft A. The propulsion power detector 6 transmits propulsion power information relating to the detected propulsion power to the controller 2.

The attack angle sensor 7 detects an attack angle from the posture of the small aircraft A. The attack angle sensor 7 transmits attack angle information relating to the detected attack angle to the controller 2. The sideslip angle sensor 8 detects the sideslip angle of the small aircraft A. The sideslip angle sensor 8 transmits sideslip angle information relating to the detected sideslip angle to the controller 2.

The meteorological radar 9 detects the meteorological state around the small aircraft A. The meteorological radar 9 detects the meteorological state, such as the presence/absence of a rain cloud or thundercloud, the direction or strength of wind. The meteorological radar 9 transmits meteorological information relating to the detected meteorological state to the controller 2. The fuel quantity detector 10 detects the fuel quantity in the fuel tank of the small aircraft A. The fuel quantity detector 10 transmits fuel quantity information relating to the detected fuel quantity to the controller 2.

The terrain information database 11 is a database which stores terrain information relating to terrains. The terrain information includes information relating to a topographical relief including a building. The terrain information also includes information relating to the emergency landing site P where the small aircraft A can make emergency landing (see FIG. 2). The terrain information also includes airport position information relating to the position of the airport Q (see FIG. 6). The terrain information database 11 transmits the terrain information to the controller 2 in accordance with a request from the controller 2.

The propulsion device detector 12 detects the state of the propulsion device, such as the engine, of the small aircraft A. The propulsion device detector 12 transmits propulsion device state information relating to the state of the propulsion device of the small aircraft A to the controller 2.

The MFD 13 is provided at the cockpit of the small aircraft A, and displays video information for the pilot. The pilot operates buttons provided in the MFD 13 to switch the content of video. The MFD 13 displays video information for the pilot in accordance with a video signal from the controller 2.

The steering actuator 14 is mechanically connected to a control part, such as a control stick, and a steering surface, such as an elevator or a rudder. The steering actuator 14 reflects the operation of the control part by the pilot in the steering surface. The steering actuator 14 controls the steering reaction force of the control part in response to a reaction force control signal from the controller 2. The steering actuator 14 controls the steering surface, such as an elevator or a rudder, in response to a steering control signal from the controller 2.

The controller 2 has a propulsion device failure determiner 21, a positional information acquirer 22, an aircraft information acquirer 23, a terrain information acquirer 24, and a gliding surface calculator 25. The controller 2 also has a flight restricted area setter 26, a flight limiting surface calculator 27, a glidable range calculator 28, and a flight control supporter 29.

The propulsion device failure determiner 21 determines failure of the propulsion of the small aircraft A on the basis of the propulsion device state information of the propulsion device detector 12. The propulsion device failure determiner 21 functions as a propulsion device failure determination unit described in the appended claims.

The positional information acquirer 22 acquires the current position information relating to the current latitude, longitude, and altitude of the small aircraft A on the basis of the positional information of the GPS receiver 3 and the flight information of the inertial navigation unit 4. The positional information acquirer 22 functions as a positional information acquisition unit described in the appended claims.

The aircraft information acquirer 23 stores basic performance information of the small aircraft A in advance. The basis performance information includes predetermined data values, such as the glide ratio, the flight range, the maximum thrust, the aerodynamic characteristics, and the weight of the small aircraft A, and values as the base of data which changes depending on the aircraft state, such as the maximum climbing rate, the minimum turning radius, and mileage.

The aircraft information acquirer 23 acquires the aircraft information of the small aircraft A on the basis of the stored basic performance information, and the positional information, the flight information, the airspeed information, the propulsion power information, the attack angle information, the sideslip angle information, and the fuel quantity information transmitted from various devices 3 to 10. The aircraft information includes the glide ratio information, the current maximum climbing rate information, the current turning radius information, and the like of the small aircraft A. The aircraft information includes the current maneuver quantity information and the current traveling direction information of the small aircraft A. The aircraft information includes the current residual flight range information relating to the range which can be reached by the small aircraft A with the quantity of remaining fuel. The aircraft information acquirer 23 calculates the current maximum climbing rate information or the turning radius information on the basis of the basic performance information, the positional information, and the flight information. The aircraft information acquirer 23 calculates the residual flight range information on the basis of the basic performance information and the fuel quantity information. The aircraft information acquirer 23 functions as an aircraft information acquisition unit described in the appended claims.

When the positional information acquirer 22 acquires the current position information, the terrain information acquirer 24 requests the terrain information database 11 for the terrain information relating to the terrain around the small aircraft A. The terrain information acquirer 24 acquires the terrain information transmitted from the terrain information database 11. The terrain information acquirer 24 recognizes the emergency landing site P around the small aircraft A on the basis of the acquired terrain information (see FIG. 2). The terrain information acquirer 24 functions as a terrain information acquisition unit described in the appended claims.

The gliding surface calculator 25 stores the legal minimum altitude H of each controlled airspace. As shown in FIG. 2, the gliding surface calculator 25 sets the legal minimum altitude surface J at the legal minimum altitude H from the ground on the basis of the terrain information of the terrain information acquirer 24.

The gliding surface calculator 25 calculates the gliding surface K for the emergency landing site P on the basis of the glide ratio information included in the aircraft information of the aircraft information acquirer 23 and the terrain information. The gliding surface calculator 25 calculates the gliding surface K for each emergency landing site P recognized by the terrain information acquirer 24. The gliding surface calculator 25 functions as a gliding surface calculation unit described in the appended claims.

As shown in FIGS. 2 and 3, the flight restricted area setter 26 sets the flight restricted surface F on the basis of a portion at a high altitude of the gliding surface K and the legal minimum altitude surface J.

The flight restricted area setter 26 calculates the maximum climbing angle β of the small aircraft A on the basis of the maximum climbing rate information included in the aircraft information of the aircraft information acquirer 23. The flight restricted area setter 26 sets the flight restricted surface F such that the climbing angle of the flight restricted surface F does not exceed the maximum climbing angle β of the small aircraft A so as to allow the small aircraft A to make a flight along the flight restricted surface F.

The flight restricted area setter 26 sets the flight restricted surface F offset in the horizontal direction from an obstacle so as to prevent the small aircraft A from colliding an obstacle, such as a mountain or a building. The flight restricted area setter 26 calculates the offset distance L in the horizontal direction from the obstacle on the basis of the current turning radius information included in the aircraft information of the aircraft information acquirer 23 (see FIG. 4).

The flight restricted area setter 26 stores the range of error in the obstacle position in the terrain information, error in the positional information of the small aircraft A, error in the maneuver state information of the small aircraft A, or the like in advance. The flight restricted area setter 26 recognizes the effect of wind around the small aircraft A on the basis of the meteorological information of the meteorological radar 9. The flight restricted area setter 26 sets the offset distance L in the horizontal direction on the basis of error in the obstacle position in the terrain information, error in the positional information of the small aircraft A, error in the maneuver state information of the small aircraft A, the effect of wind, and the like, in addition to the current turning radius information. The flight restricted area setter 26 sets the flight restricted surface F away from the obstacle at equal to or greater than the offset distance L in the horizontal direction.

The flight restricted area setter 26 determines whether or not there is a meteorological obstruction, such as a thundercloud, on the basis of the meteorological information of the meteorological radar 9. When it is determined that there is a meteorological obstruction, the flight restricted area setter 26 sets the flight restricted surface F corresponding to the meteorological obstruction.

The flight restricted area setter 26 determines whether or not the small aircraft A is near the airport on the basis of the current position information acquired by the positional information acquirer 22 and the airport position information included in the terrain information of the terrain information acquirer 24. When it is determined that the small aircraft A is near the airport, the flight restricted area setter 26 sets the flight restricted surface F corresponding to the flight course so as to lead the small aircraft A to the flight course set in advance.

The flight restricted area setter 26 stores controlled airspace information relating to a controlled airspace in advance. The flight restricted area setter 26 determines whether or not the small aircraft A is near a controlled airspace boundary on the basis of the stored controlled airspace information and the current position information of the positional information acquirer 22. When it is determined that the small aircraft A is near the controlled airspace boundary, the flight restricted area setter 26 sets the flight restricted surface F corresponding to the controlled airspace boundary.

The flight restricted area setter 26 determines whether or not the small aircraft A obtains passage through the controlled airspace boundary from the flight control in accordance with the input of a passage button by the pilot. The flight restricted area setter 26 may recognize sound sent from the flight control to determine whether or not passage is obtained. When passage is transmitted as electronic data, the flight restricted area setter 26 may determine whether or not passage is obtained in accordance with the reception of electronic data of passage.

When it is determined that the small aircraft A has obtained passage through the controlled airspace boundary from the flight control, the flight restricted area setter 26 releases the flight restricted surface F of the controlled airspace boundary. When it is determined that the small aircraft A has passed through the controlled airspace boundary on the basis of the current position information of the positional information acquirer 22, the flight restricted area setter 26 sets the flight restricted surface F at the controlled airspace boundary again.

As shown in FIG. 6, the flight limiting surface calculator 27 calculates the flight limiting surface M on the basis of the current position information of the positional information acquirer 22, the residual flight range information included in the aircraft information of the aircraft information acquirer 23, and the airport position information included in the terrain information of the terrain information acquirer 24. The flight limiting surface calculator 27 calculates the flight limiting surface M on the basis of the traveling direction information included in the flight information of the inertial navigation unit 4 or the meteorological information of the meteorological radar 9 taking into consideration the effect of the turning of the small aircraft A on the residual flight range Re or the effect of wind or terrain. The flight limiting surface calculator 27 functions as a flight limiting surface calculation unit described in the appended claims. The flight restricted area setter 26 sets the flight restricted surface F corresponding to the flight limiting surface M calculated by the flight limiting surface calculator 27.

When the propulsion device failure determiner 21 determines that the propulsion device of the small aircraft A fails, the glidable range calculator 28 calculates the glidable range which can be reached by the small aircraft A by gliding on the basis of altitude information included in the current position information of the positional information acquirer 22, the glide ratio information and the maneuver state information included in the aircraft information of the aircraft information acquirer 23, and the terrain information of the terrain information acquirer 24. The glidable range calculator 28 functions as a glidable range calculation unit described in the appended claims.

When the glidable range calculator 28 calculates the glidable range, the flight restricted area setter 26 determines the best emergency landing site from among the emergency landing sites P within the glidable range on the basis of the glidable range calculated by the glidable range calculator 28, the current position information of the positional information acquirer 22, the aircraft information of the aircraft information acquirer 23, and the emergency landing site information acquired by the terrain information acquirer 24. The best emergency landing site is the site where an impact on the small aircraft A during emergency landing is smallest. The flight restricted area setter 26 sets the flight restricted surface F so as to lead the small aircraft A to the best emergency landing site. When the flight restricted surface F is already set, the flight restricted area setter 26 substitutes the set flight restricted surface F with a new flight restricted surface F corresponding to the glidable range so as to place priority on safety of the small aircraft A.

The flight restricted area setter 26 sets the flight restricted area W for each flight restricted surface F. The flight restricted area setter 26 sets the airspace between the flight restricted surface F set along the terrain and the ground as the flight restricted area W. That is, the flight restricted area setter 26 sets the flight restricted area W along the terrain. The flight restricted area setter 26 sets the airspace outside the flight restricted surface F when viewed from the small aircraft A as the flight restricted area W. The flight restricted area setter 26 functions as a flight restricted area setting unit described in the appended claims.

The flight control supporter 29 performs flight control support of the small aircraft A on the basis of the flight restricted area W set by the flight restricted area setter 26. The flight control support device 1 performs flight control support such that the small aircraft A is in the balanced state on the flight restricted area W set along the terrain. The flight control supporter 29 performs flight control support such that the small aircraft A does not enter the flight restricted area W. When the small aircraft A enters the flight restricted area W, the flight control supporter 29 performs flight control support such that the small aircraft A returns outside the flight restricted area W.

Specifically, the flight control supporter 29 determines whether or not the small aircraft A is outside the flight restricted area W on the basis of the current position information of the positional information acquirer 22 and the flight restricted area W of the flight restricted area setter 26. When it is determined that the small aircraft A is outside the flight restricted area W, the flight control supporter 29 determines whether or not the flight restricted area W is on the course of the small aircraft A on the basis of the traveling direction information included in the flight information of the inertial navigation unit 4.

When it is determined that the flight restricted area W is on the course of the small aircraft A, the flight control supporter 29 calculates a manual evasion distance as the distance at which the flight restricted area W can be evaded by manual flight control. Specifically, the flight control supporter 29 calculates variations in the aircraft posture angle and propulsion power necessary for changing the small aircraft A to a course outward of the flight restricted area W on the basis of the current position information of the positional information acquirer 22, the basic performance information of the aircraft information acquirer 23, and the flight restricted area W of the flight restricted area setter 26. The flight control supporter 29 calculates the steering angle necessary for changing the aircraft posture on the basis of the variations in the aircraft posture angle and propulsion power. The flight control supporter 29 calculates the time necessary for steering from the calculated steering angle and responsiveness of the steering actuator 14. The flight control supporter 29 calculates the manual evasion distance at which the flight restricted area W can be evaded by manual flight control on the basis of the time necessary for steering and the airspeed information of the airspeed indicator 5.

The flight control supporter 29 determines whether or not the distance between the small aircraft A and the flight restricted area W on the course is equal to or smaller than the manual evasion distance on the basis of the calculated manual evasion distance, the current position information of the positional information acquirer 22, and the flight restricted area W of the flight restricted area setter 26. When it is determined that the distance between the small aircraft A and the flight restricted area W on the course is equal to or smaller than the manual evasion distance, the flight control supporter 29 determines that steering control is required. When it is determined that steering control is required, the flight control supporter 29 transmits a steering control signal according to the calculated steering angle to the steering actuator 14. The steering actuator 14 controls the steering surface of the small aircraft A such that the small aircraft A is on the course outward of the flight restricted area W.

When it is determined that the small aircraft A is already within the flight restricted area W, the flight control supporter 29 transmits a video signal for displaying a warning to the pilot to the MFD 13. The flight control supporter 29 transmits a sound signal for giving a warning to the pilot to a speaker in the cockpit. The MFD 13 displays a warning to the pilot about the small aircraft A entering the flight restricted area W and the ground or an obstacle.

The flight control supporter 29 performs calculation relating to steering control for returning the small aircraft A outside the flight restricted area W on the basis of the flight information of the inertial navigation unit 4, the current position information of the positional information acquirer 22 and the flight restricted area W of the flight restricted area setter 26. The flight control supporter 29 calculates the steering angle for returning the small aircraft A outside the flight restricted area W. The flight control supporter 29 transmits a steering control signal according to the calculated steering angle to the steering actuator 14. The steering actuator 14 controls the steering surface of the small aircraft A such that the small aircraft A is on the course outward of the flight restricted area W.

The flight control supporter 29 performs steering reaction force control of the control stick of the control part using the steering actuator 14 so as to suppress flight control for getting the small aircraft A near the ground or an obstacle. In the steering reaction force control, the steering reaction force is controlled to increase for an operation to pull down the control stick so as to get the small aircraft A near the ground or an obstacle.

Figure 7:
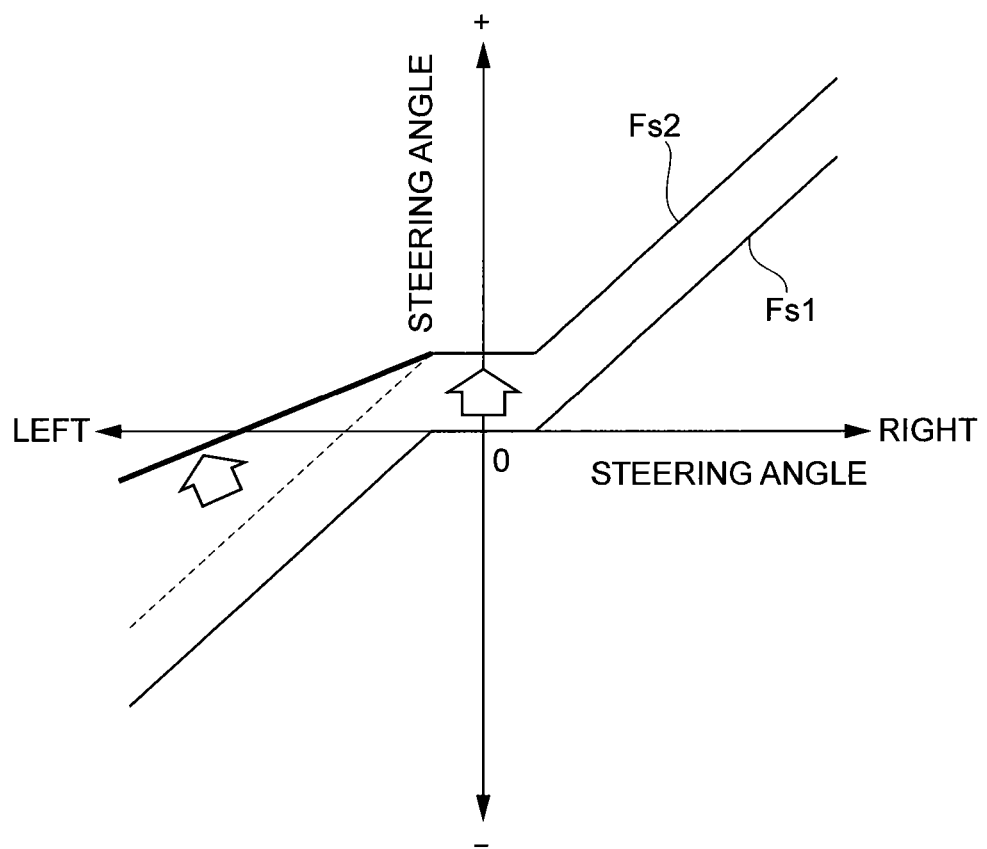
FIG. 7 is a graph showing the relationship between a steering angle and a steering reaction force in steering reaction force control.

FIG. 7 shows the relationship between a steering force and a steering angle in steering reaction force control as a graph. In FIG. 7, the relationship between a steering force and a steering angle for pulling down the control stick in the left and right direction is shown. In FIG. 7, a case where the ground or an obstacle is on the front left side of the small aircraft A will be described.

Fs1 shown in FIG. 7 represents the relationship between a steering force and a steering angle outside the flight restricted area W. In Fs1, the steering force is 0, that is, the control stick is not controlled at all, and the steering angle of the small aircraft A is 0. The state where the steering force is 0 becomes the balanced state of the small aircraft A. Around the origin (the point where the steering force and the steering angle are 0) of the graph becomes a blind zone where the steering angle does not react to change in the steering force. In Fs1, the steering force and the steering angle for pulling down the control stick left and right have a proportional relationship except for the blind zone.

Fs2 shown in FIG. 7 represents the relationship between a steering force and a steering angle within the flight restricted area W. In Fs2, the balanced state where the steering force is 0 is made at a predetermined steering angle through steering control for returning the small aircraft A outside the flight restricted area W. That is, the posture of the small aircraft A is tilted outward of the flight restricted area W at a predetermined in a state where the control stick is not controlled at all.

In Fs2, steering reaction force control is performed such that the steering force necessary for tilting the control stick left is larger than Fs1. The steering reaction force control may be performed such that the magnitude of the steering reaction force continuously changes in accordance with how much the small aircraft A enters the flight restricted area W. Through the steering reaction force control, since the pilot can recognize that the operation to tilt the control stick left is the operation to get near the ground or an obstacle, it is possible to achieve improvement in safety of the small aircraft A.

Next, the flow of processing of the above-described flight control support device 1 will be described. First, the flow of processing involved in flight restricted area setting and emergency flight control support in the flight control support device 1 will be described.

Figure 8:
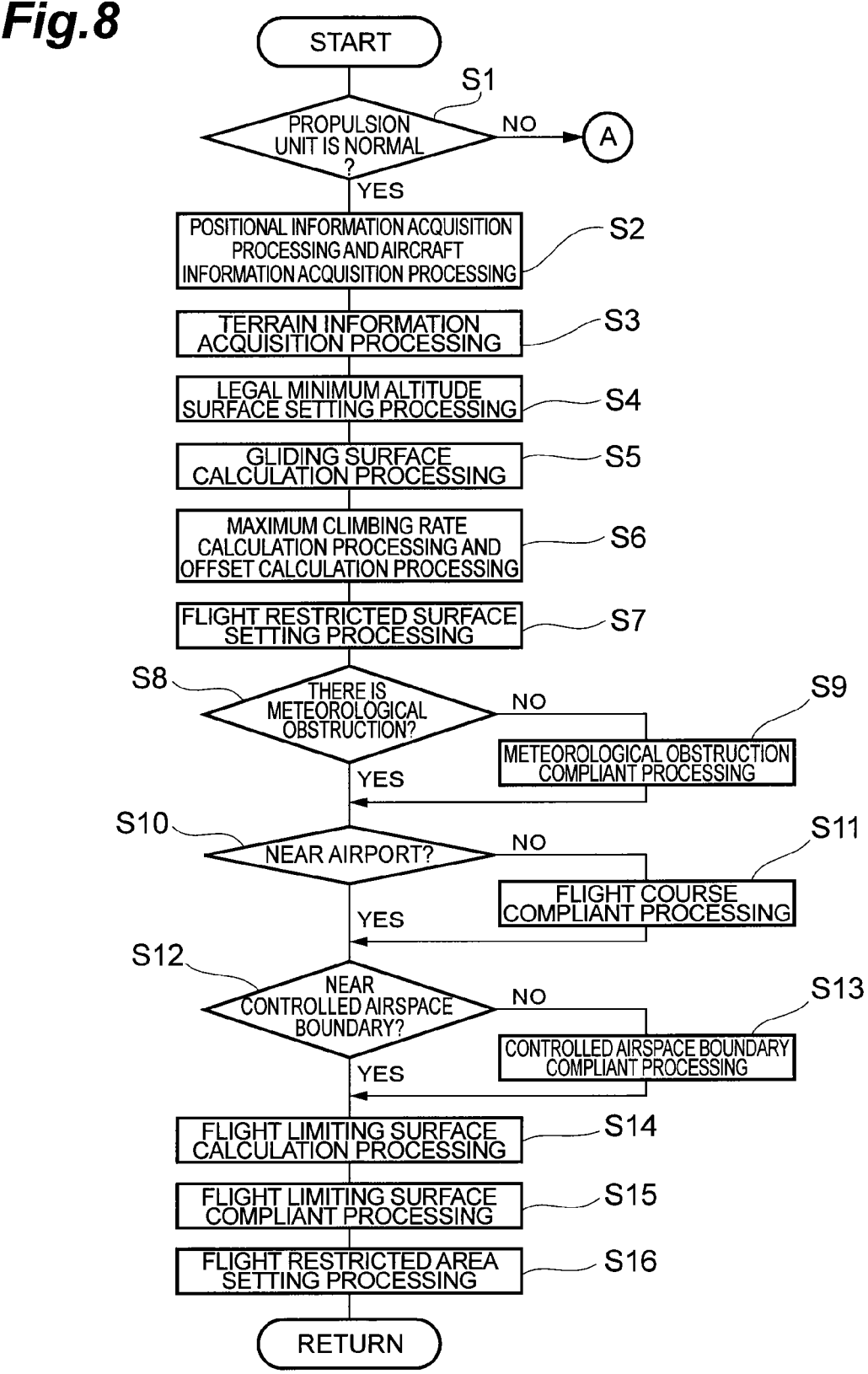
FIG. 8 is a flowchart showing the flow of processing involved in setting of a flight restricted area.

As shown in FIG. 8, in S1, the propulsion device failure determiner 21 performs propulsion device failure determination processing for determining whether the propulsion device of the small aircraft A fails or normal. When the propulsion device failure determiner 21 determines that the propulsion device is normal, the positional information acquirer 22 performs positional information acquisition processing for acquiring the current position information of the small aircraft A on the basis of the positional information of the GPS receiver 3 and the flight information of the inertial navigation unit 4 (S2). The aircraft information acquirer 23 performs aircraft information acquisition processing for acquiring the aircraft information of the small aircraft A on the basis of the stored basic performance information, and the positional information, the flight information, the airspeed information, the propulsion power information, the attack angle information, the sideslip angle information, and the fuel quantity information transmitted from various devices 3 to 10.

In S3, the terrain information acquirer 24 performs terrain information acquisition processing for acquiring the terrain information from the terrain information database 11. Thereafter, the gliding surface calculator 25 performs legal minimum altitude compliant processing for setting the legal minimum altitude surface J at the legal minimum altitude H from the ground on the basis of the terrain information of the terrain information acquirer 24 (S4). Thereafter, the gliding surface calculator 25 performs gliding surface calculation processing for calculating the gliding surface K for the emergency landing site P on the basis of the glide ratio information included in the aircraft information of the aircraft information acquirer 23 (S5).

In S6, the flight restricted area setter 26 performs maximum climbing angle calculation processing for calculating the maximum climbing angle $\beta$ of the small aircraft A on the basis of the maximum climbing rate information included in the aircraft information of the aircraft information acquirer 23. The flight restricted area setter 26 performs offset calculation processing for calculating the offset distance L in the horizontal direction from an obstacle on the basis of the various measurement errors or the effect of wind, in addition to the current turning radius information included in the aircraft information of the aircraft information acquirer 23.

The flight restricted area setter 26 sets the flight restricted surface F on the basis of a portion at a high altitude of the gliding surface K and the legal minimum altitude surface J (S7). The flight restricted area setter 26 sets the flight restricted surface F such that the climbing angle of the flight restricted surface F does not exceed the maximum climbing angle $\beta$ of the small aircraft A so as to allow the flight of the small aircraft A along the flight restricted surface F. The flight restricted area setter 26 sets the flight restricted surface F away from an obstacle at equal to or greater than the offset distance L in the horizontal direction so as to prevent the small aircraft A from colliding against an obstacle, such as a mountain or a building.

Thereafter, the flight restricted area setter 26 determines whether or not there is a meteorological obstruction, such as a thundercloud, on the basis of the meteorological information of the meteorological radar 9 (S8). When it is determined that there is no meteorological obstruction, the flight restricted area setter 26 progresses to S10. When it is determined that there is a meteorological obstruction, the flight restricted area setter 26 performs meteorological obstruction compliant processing for setting the flight restricted surface F corresponding to the meteorological obstruction (S9). Thereafter, the process progresses to S10.

In S10, the flight restricted area setter 26 determines whether or not the small aircraft A is near the airport on the basis of the current positional information acquired by the positional information acquirer 22 and the airport position information included in the terrain information of the terrain information acquirer 24. When it is determined that the small aircraft A is not near the airport, the flight restricted area setter 26 progresses to S12. When it is determined that the small aircraft A is near the airport, the flight restricted area setter 26 performs flight source compliant processing for setting the flight restricted surface F corresponding to the flight course so as to lead the small aircraft A to the flight course set in advance (S11). Thereafter, the process progresses to S12.

In S12, the flight restricted area setter 26 determines whether or not the small aircraft A is near the controlled airspace boundary on the basis of the stored controlled airspace information and the current position information of the positional information acquirer 22. When it is determined that the small aircraft A is not near the controlled airspace boundary, the flight restricted area setter 26 progresses to S14. When it is determined that the small aircraft A is near the controlled airspace boundary, the flight restricted area setter 26 performs controlled airspace boundary compliant processing for setting the flight restricted surface F corresponding to the controlled airspace boundary (S13).

In S14, the flight limiting surface calculator 27 performs flight limiting surface calculation processing for calculating the flight limiting surface M on the basis of the current position information of the positional information acquirer 22, the residual flight range information included in the aircraft information of the aircraft information acquirer 23, and the airport position information included in the terrain information of the terrain information acquirer 24.

Thereafter, the flight restricted area setter 26 performs flight limiting surface compliant processing for setting the flight restricted surface F corresponding to the flight limiting surface M calculated by the flight limiting surface calculator 27 (S15). Subsequently, the flight restricted area setter 26 sets the flight restricted area W for each flight restricted surface F (S16).

Next, the flow of processing involved in emergency flight control support when in S1, the propulsion device failure determiner 21 determines that the propulsion device fails will be described.

Figure 9:
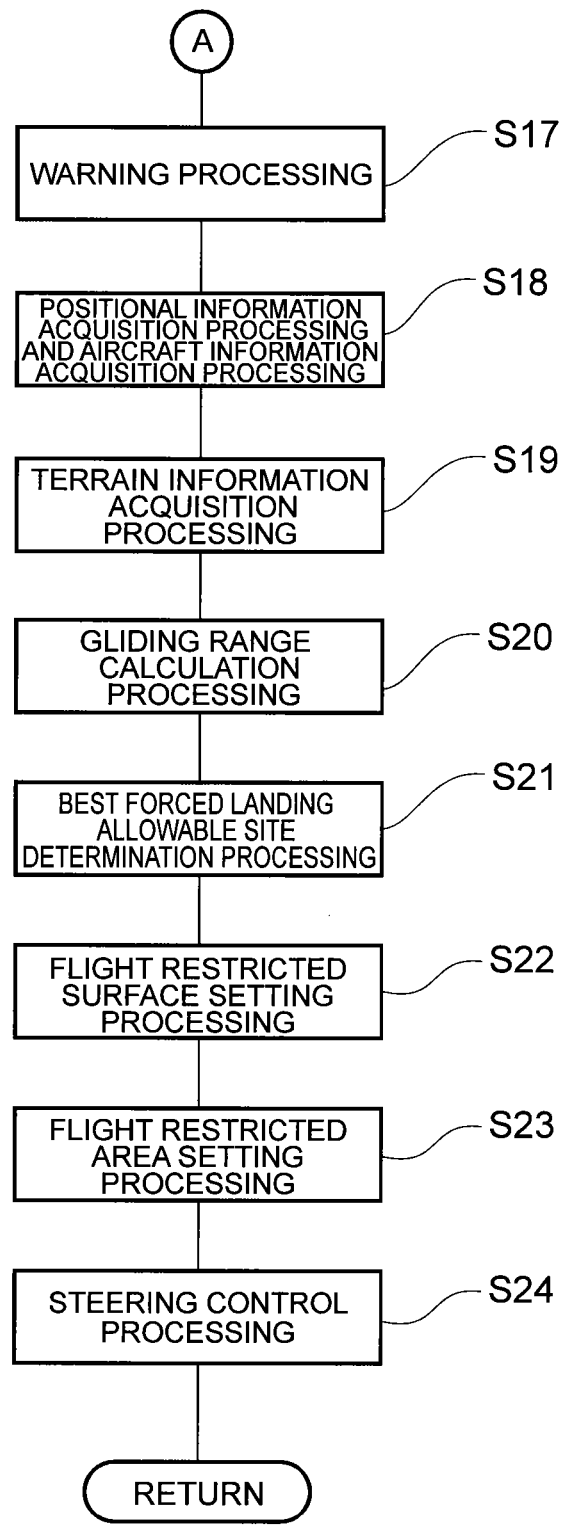
FIG. 9 is a flowchart showing the flow of processing involved in flight control support in emergency.

As shown in FIG. 9, when the propulsion device failure determiner 21 determines that the propulsion device fails, the flight control supporter 29 performs warning processing in which a warning signal for giving a warning to the pilot is transmitted to the MFD 13 (S17). The MFD 13 gives a warning to the pilot about failure of the propulsion device of the small aircraft A.

In S18, the positional information acquirer 22 performs positional information acquisition processing for acquiring the current position information of the small aircraft A on the basis of the positional information of the GPS receiver 3 and the flight information of the inertial navigation unit 4. The aircraft information acquirer 23 performs aircraft information acquisition processing for acquiring the aircraft information of the small aircraft A on the basis of the stored basic performance information and various kinds of information transmitted from various devices 3 to 10. In S19, the terrain information acquirer 24 performs terrain information acquisition processing for acquiring the terrain information from the terrain information database 11.

In S20, the glidable range calculator 28 calculates the glidable range which can be reached by the small aircraft A by gliding on the basis of the altitude information included in the current position information of the positional information acquirer 22, the aerodynamic characteristic information and the maneuver quantity state information included in the aircraft information of the aircraft information acquirer 23, and the terrain information of the terrain information acquirer 24.

Thereafter, the flight restricted area setter 26 performs best emergency landing site determination processing for determining the best emergency landing site from among the emergency landing sites P within the glidable range on the basis of the glidable range calculated by the glidable range calculator 28, the current position information of the positional information acquirer 22, the aircraft information of the aircraft information acquirer 23, and the emergency landing site information acquired by the terrain information acquirer 24 (S21).

Subsequently, the flight restricted area setter 26 performs flight restricted surface setting processing for setting the flight restricted surface F so as to lead the small aircraft A to the best emergency landing site (S22). When the flight restricted surface F is already set, the flight restricted area setter 26 substitutes the set flight restricted surface F with a new flight restricted surface F corresponding to the glidable range so as to place priority on safety of the small aircraft A. The flight restricted area setter 26 performs flight restricted area setting processing for setting the airspace outside the flight restricted surface F when viewed from the small aircraft A as the flight restricted area W (S33).

In S24, the flight control supporter 29 performs steering control processing in which the steering control signal is transmitted to the steering actuator 14 so as to perform flight control support of the small aircraft A along the flight restricted area W. Specifically, the flight control supporter 29 calculates the variations in the course angle and the roll angle for keeping on the flight restricted area W. Next, the flight control supporter 29 calculates the steering angle necessary for changing and correcting the course angle and the roll angle. Subsequently, the flight control supporter 29 calculates the quantity of steering corresponding to the calculated steering angle. The flight control supporter 29 calculates the steering force necessary for the calculated quantity of steering as the sum of the maximum additional quantity and a normal air reaction force because of emergency, and transmits the steering force to the steering actuator 14 as a steering control signal. The steering actuator 14 controls the steering surface in response to the steering control signal. The steering actuator 14 controls the steering surface such that the small aircraft A is led to the best emergency landing site along the flight restricted area W.

Subsequently, the flow of processing involved in flight control support in a normal state in the flight control support device 1 will be described.

Figure 10:
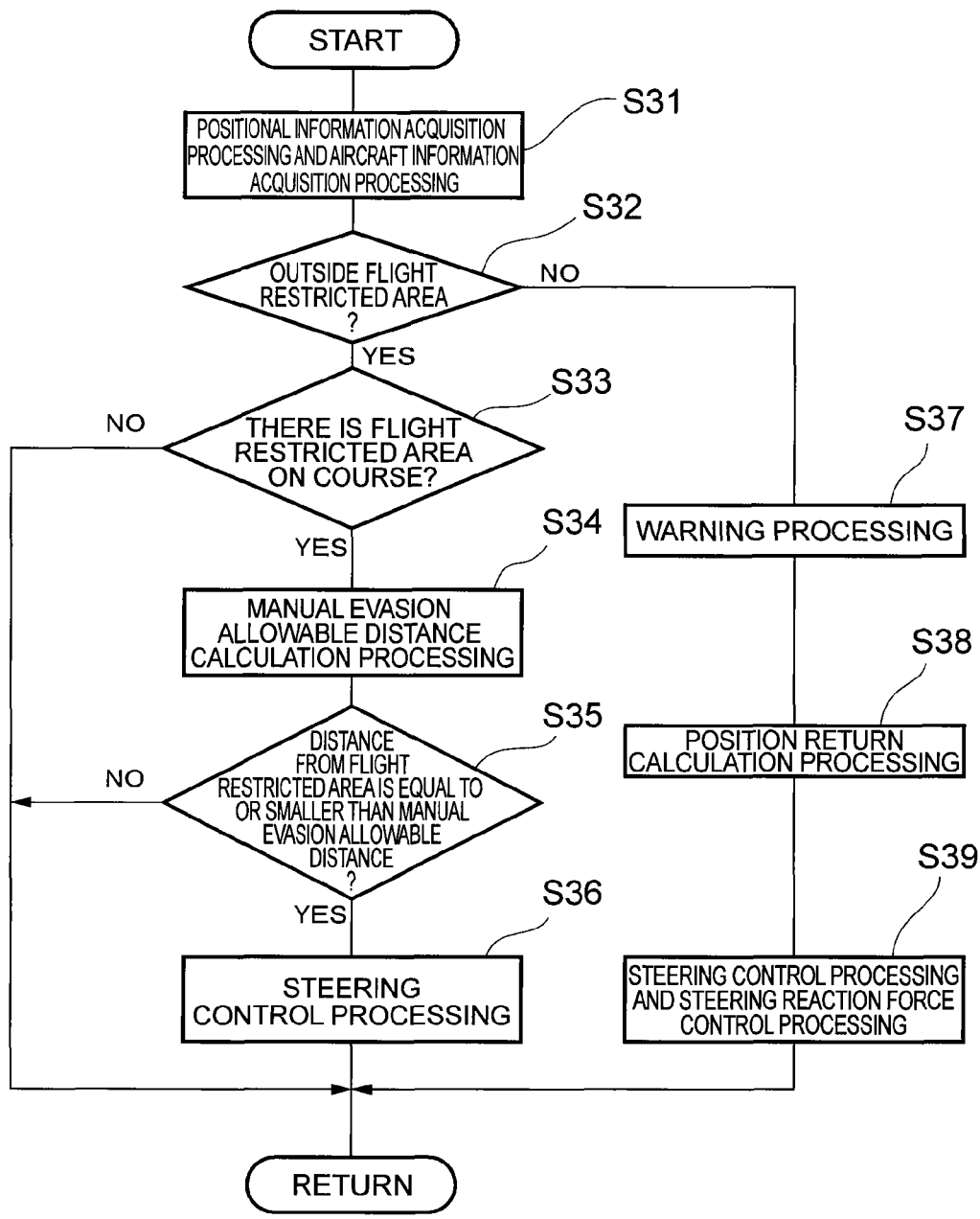
FIG. 10 is a flowchart showing the flow of processing involved in flight control support in a normal state.

As shown in FIG. 10, in S31, the positional information acquirer 22 performs positional information acquisition processing for acquiring the current position information of the small aircraft A on the basis of the positional information of the GPS receiver 3 and the flight information of the inertial navigation unit 4. The aircraft information acquirer 23 performs aircraft information acquisition processing for acquiring the aircraft information of the small aircraft A on the basis of the stored basic performance information and various kinds of information transmitted from various devices 3 to 10.

Next, the flight control supporter 29 determines whether or not the small aircraft A is outside the flight restricted area W on the basis of the current position information of the positional information acquirer 22 and the flight restricted area W of the flight restricted area setter 26 (S32). When it is determined that the small aircraft A is outside the flight restricted area W, the flight control supporter 29 determines whether or not the flight restricted area W is on the course of the small aircraft A on the basis of the traveling direction information of the inertial navigation unit 4 (S23). When it is determined that the flight restricted area W is not on the course of the small aircraft A, the flight control supporter 29 ends the processing.

When it is determined that the flight restricted area W is on the course of the small aircraft A, the flight control supporter 29 performs manual evasion distance calculation processing for calculating the manual evasion distance (S34). Thereafter, the flight control supporter 29 determines whether or not the distance between the small aircraft A and the flight restricted area W on the course is equal to or smaller than the manual evasion distance on the basis of the calculated manual evasion distance, the current position information of the positional information acquirer 22, and the flight restricted area W of the flight restricted area setter 26 (S35). When it is determined that the distance between the small aircraft A and the flight restricted area W on the course is not equal to or smaller than the manual evasion distance, the flight control supporter 29 ends the processing.

When it is determined that the distance between the small aircraft A and the flight restricted area W on the course is equal to or smaller than the manual evasion distance, the flight control supporter 29 performs steering control processing for transmitting a steering control signal to the steering actuator 14 (S36). The steering actuator 14 controls the steering surface of the small aircraft A such that the small aircraft A is on the course outward of the flight restricted area W.

When it is determined in S32 that the small aircraft A is already within the flight restricted area W, the flight control supporter 29 performs warning processing in which a warning signal is transmitted to the MFD 13 so as to give a warning to the pilot (S37). The MFD 13 gives a warning to the pilot about the small aircraft A entering the flight restricted area W and the ground or an obstacle.

Thereafter, the flight control supporter 29 performs position return calculation processing in which calculation relating to steering control for returning the small aircraft A outside the flight restricted area W is performed on the basis of the flight information of the inertial navigation unit 4, the current position information of the positional information acquirer 22, and the flight restricted area W of the flight restricted area setter 26 (S38). The flight control supporter 29 calculates the steering angle for returning the small aircraft A outside the flight restricted area W.

In S39, the flight control supporter 29 performs steering control processing for transmitting a steering control signal according to the calculated steering angle to the steering actuator 14. The flight control supporter 29 performs steering reaction force control of the control stick of the control part using the steering actuator 14 so as to suppress flight control for getting the small aircraft A near the ground or an obstacle.

Subsequently, the functional effects of the flight control support device 1 of this embodiment will be described.

According to the above-described flight control support device 1, since flight control of the small aircraft A is supported on the basis of the flight restricted area W set along the terrain, it is possible to appropriately suppress an unintended approach of the small aircraft A to the ground, thereby achieving improvement in safety of the small aircraft A. According to the flight control support device 1, the flight restricted area W is set on the basis of the aircraft information of the small aircraft A, making it possible to set the flight restricted area W which can be evaded with reasonable flight control based on the maneuverability of the small aircraft A. According to the flight control support device 1, since the flight restricted area W is set along the terrain, it is possible to avoid an unnecessary limitation on a flight course, thereby sufficiently securing the degree of freedom of flight course selection of the pilot of the small aircraft A. Therefore, according to the flight control support device 1, it is possible to achieve improvement in safety of the small aircraft A and to sufficiently secure the degree of freedom of flight course selection.

According to the flight control support device 1, the flight restricted area W is set on the gliding surface K as the reference of the altitude at which the small aircraft A can reach the emergency landing site P by gliding, making it possible to perform flight control support such that the small aircraft A can reach the emergency landing site P by gliding even when the power fails during flight. Therefore, according to the flight control support device 1, it is possible to achieve improvement in safety of the small aircraft A.

According to the flight control support device 1, the flight restricted area W is set on the basis of the maximum climbing rate information of the small aircraft A, making it possible to set the flight restricted area W such that evasion can be done with reasonable flight control according to the climbing performance of the small aircraft A. This contributes to improvement in stability and riding comfort of the small aircraft A.

According to the flight control support device 1, the flight limiting surface M as the reference of the airspace where the small aircraft A can land at the airport Q within the residual flight range Re can be calculated on the basis of the positional information of the small aircraft A, the airport position information, and the residual flight range information. For this reason, according to the flight control support device 1, the flight restricted area W is set on the basis of the flight limiting surface M, thereby avoiding the small aircraft A from entering the airspace where the small aircraft A does not return to the airport Q.

According to the flight control support device 1, since flight control for returning the small aircraft A outside the flight restricted area W is performed when the small aircraft A enters the flight restricted area W, even when the pilot is unaware of entering the flight restricted area W, it is possible to secure safety of the small aircraft A.

According to the flight control support device 1, when the propulsion device of the small aircraft A fails, the glidable range which can be reached by the small aircraft A only by gliding is calculated, and the flight restricted area W is set so as to lead the small aircraft A to the best emergency landing site within the glidable range, thereby increasing the success probability of emergency landing of the small aircraft A. Therefore, according to the flight control support device 1, it is possible to achieve improvement in safety of the small aircraft A.

The invention is not limited to the above-described embodiment.

For example, the invention may be applied to a flying object other than a small aircraft. The flight restricted area W may not be set for all items of the gliding surface K, the maximum climbing angle β, the meteorological obstruction, and the like, and the flight restricted area W may be set only for an arbitrary item.

Although in the above-described embodiment, a sightseeing flight in which the flight course is not determined has been described, the invention may be applied to a case where the flight course is determined. When the flight course of the flying object is determined, the flight control support device may set the flight restricted surface F at an altitude at which the optimum fuel efficiency is obtained. In this case, the flight control support device first determines whether or not a predetermined flight course is determined from the input of the pilot to a navigation system or flight situations along a predetermined flight source. When it is determined that a predetermined flight course is determined, from the general fact that, as the altitude of the flying object is high, the flight range is extended and mileage is improved, the flight control support device sets the flight restricted surface F such that the flying object makes a flight at the altitude at which the optimum fuel efficiency is obtained. According to this flight control support device, it is possible to achieve improvement in fuel efficiency of the flying object. According to this flight control support device, since the flying object makes a flight at a high altitude along the flight restricted surface F, it is possible to widen the range which can be reached by gliding when the power fails. As a result, since there is an increasing possibility that the flying object can reach the emergency landing site P by gliding, thereby facilitating a response to emergency.

The flight control support device according to the invention may not be mounted in the flying object. For example, the flight control support device may be provided in an above-ground information center. In this case, the information center sets the flight restricted area W on the basis of positional information transmitted from the flying object in a wireless manner or the flight airspace of the flying object input in advance. The information center transmits information relating to the flight restricted area W to the flying object. The information center performs information support based on the flight restricted area W as flight control support for the flying object. Examples of the information support include the transmission of steering program information corresponding to the flight restricted area W, and the like.

INDUSTRIAL APPLICABILITY

The invention can be used in the flight control support device which supports flight control of the flying object.

REFERENCE SIGNS LIST

1: flight control support device, 2: controller, 3: GPS receiver, 4: inertial navigation unit, 5: airspeed indicator, 6: propulsion power detector, 7: attack angle sensor, 8: sideslip angle sensor, 9: meteorological radar, 10: fuel quantity detector, 11: terrain information database, 12: propulsion device detector, 13: MFD 14: steering actuator, 21: propulsion device failure determiner (propulsion device failure determination unit), 22: positional information acquirer (positional information acquisition unit), 23: aircraft information acquirer (aircraft information acquisition unit), 24: terrain information acquirer (terrain information acquisition unit), 25: gliding surface calculator (gliding surface calculation unit), 26: flight restricted area setter (flight restricted area setting unit), 27: flight limiting surface calculator (flight limiting surface calculation unit), 28: glidable range calculator (glidable range calculation unit), 29: flight control supporter (flight control support unit), A: small aircraft, F: flight restricted surface, J: legal minimum altitude surface, K: gliding surface, M: flight limiting surface, P: emergency landing site, W: flight restricted area, α: gliding angle, β: maximum climbing angle

The invention claimed is:

1. A flight control support device which supports flight control of a flying object, the flight control support device comprising:
a terrain information acquisition unit which acquires terrain information;
an aircraft information acquisition unit which acquires aircraft information of the flying object, and the aircraft information includes maximum climbing rate information of the flying object;
a flight restricted area setting unit which sets a flight restricted area along a terrain on the basis of the terrain information acquired by the terrain information acquisition unit and the aircraft information acquired by the aircraft information acquisition unit; and
a flight control support unit which supports flight control of the flying object on the basis of the flight restricted area set by the flight restricted area setting unit.

2. The flight control support device according to claim 1, wherein the terrain information includes emergency landing site information relating to a emergency landing site,
the aircraft information includes glide ratio information of the flying object,
the flight control support device further comprises:
a gliding surface calculation unit which calculates a gliding surface for the emergency landing site on the basis of the emergency landing site information and the glide ratio information, and
the flight restricted area setting unit sets the flight restricted area on the basis of the gliding surface calculated by the gliding surface calculation unit.

3. The flight control support device according to claim 2, further comprising:
a propulsion device failure determination unit which determines failure of a propulsion device of the flying object;
a positional information acquisition unit which acquires positional information of the flying object; and
a glidable range calculation unit which calculates a glidable range of the flying object on the basis of the positional information and the glide ratio information of the flying object when the propulsion device failure determination unit determines that the propulsion device fails,
wherein, when the glidable range calculation unit calculates the glidable range, the flight restricted area setting unit sets the flight restricted area on the basis of the glidable range, the positional information of the flying object, and the emergency landing site information so as to lead the flying object to the emergency landing site within the glidable range.

4. The flight control support device according to claim 1, wherein the flight restricted area setting unit sets the flight restricted area on the basis of the maximum climbing rate information.

5. The flight control support device according to claim 1, wherein the terrain information includes airport position information relating to the position of an airport,
the aircraft information includes residual flight range information of the flying object,
the flight control support device further comprises:
a positional information acquisition unit which acquires positional information of the flying object; and
a flight limiting surface calculation unit which calculates a flight limiting surface for the airport on the basis of the positional information of the flying object acquired by the positional information acquisition unit, the airport position information, and the residual flight range information, and
the flight restricted area setting unit sets the flight restricted area on the basis of the flight limiting surface calculated by the flight limiting surface calculation unit.

6. The flight control support device according to claim 1, wherein, when the flying object enters the flight restricted area, the flight control support unit performs flight control for returning the flying object outside the flight restricted area.

* * * * *